UNITED STATES PATENT OFFICE.

HIPPOLYT KÖHLER, OF BERLIN, GERMANY, ASSIGNOR TO THE FIRM OF RÜTGERSWERKE ACTIENGESELLSCHAFT, OF BERLIN, GERMANY.

MANUFACTURE OF SULFUR, &c.

No. 898,378.            Specification of Letters Patent.            Patented Sept. 8, 1908.

Application filed May 18, 1907. Serial No. 374,467.

*To all whom it may concern:*

Be it known that I, HIPPOLYT KÖHLER, doctor of philosophy, chemist, a subject of the King of Bavaria and the German Emperor, residing at 3 Frobenstrasse, Berlin, German Empire, have invented new and useful Improvements in and Relating to the Manufacture of Sulfur Compounds, of which the following is a specification.

It is known that melted naphthalene is able to decompose sulfur (Lunge-Köhler, "*Industrie des Steinkohlenteers*" Fourth Edition Vol. 1 page 172). It has not hitherto been known, however, how a solution of sulfur in melted naphthalene behaves on cooling. At first it was thought that on cooling the sulfur separated from the melted naphthalene in a pure crystalline condition. However, it was shown that this natural assumption is not correct. On the cooling of the melted mass it is true that crystals are formed, but they do not consist of pure sulfur but are composed of naphthalene and sulfur, so that probably we have what is termed a fixed solution. It has proved to be possible to combine very considerable quantities of sulfur with naphthalene even at a temperature of from 85° to 90° C., which is only a few degrees above the melting point of naphthalene; that is to say 2 atoms of sulfur 64 parts by weight may be combined with 1 molecule of naphthalene 128 parts by weight. This molecular combination of naphthalene and sulfur also permits of absorbing still further quantities of naphthalene and sulfur. If such a liquid solution of 4 atoms of sulfur 128 parts by weight and 1 molecule of naphthalene 128 parts by weight be allowed to cool in a porcelain crucible which should however be protected so that it does not cool too rapidly, until the surface of the liquid has set and the crust then broken and the still liquid contents allowed to flow out, it will be found that the crucible is completely strewn with long pointed, highly lustrous crystals of a pale yellow color, which when washed with absolute alcohol, have a melting point of 98°–100° C. The mass when set also has the same melting point.

The crystals dissolve readily in boiling benzol and crystals presenting the melting point of sulfur (113° to 115°) are obtained from the solution. Decomposition therefore sets in and the benzol withdraws the whole of the napthalene from the product. The same thing occurs on treating the preparation with alcohol; as, however, sulfur is not soluble in alcohol in this case it separates out in a very finely divided condition. The napthalene also volatilizes gradually on exposure to the air, particularly with a moderate heat and leaves the sulfur behind likewise in a condition of the finest molecular division. The property is also possessed to a high degree even by a product containing more than 4 molecules of sulfur, which, for example, has been speedily cooled by vigorous stirring in cold water. This ready decomposition of the product in question, and in particular the circumstance that the sulfur is thereby separated out in an extremely finely divided condition, constitute a special feature. The napthalene-sulfur (1 molecule: 4 molecules) presents approximately the hardness of ordinary sulfur and like this may be cast in rods or ground to the finest powder. Owing to these properties of naphthalene-sulfur, to the known action of naphthalene and also to the sulfur present in a molecular condition, the product is specially suited for use as a deodorizer, disinfectant and antiparasitic (for example in the wine industry for combatting the oidium and phylloxera vastratrix (see Ernst Fischer, "*Berliner klin. Wochenschrift*" 1881 No. 48 and 1882 No. 8) for the manufacture of soaps, salves and the like, as a sulfur-yielding medium for chemical processes, say for example in the vulcanization of caoutchouc, the manufacture of wood cement and for the production of molecular sulfur. It cannot be definitely stated whether the described product is a chemical compound of naphthalene with sulfur or a so-called solid solution.

In manufacturing the product from naphthalene and sulfur, preferably the naphthalene is melted and at a few degrees above its melting point (at 85° to 90°) the coarsely pulverized sulfur is introduced into the melted naphthalene. It is advantageous to take equal quantities by weight of naphthalene and sulfur, but either one of the constituents may predominate in the mixture, as the solubility of sulfur in naphthalene increases with the temperature. It is also possible, although less advantageous, to introduce the naphthalene into the melted sulfur. The final product may be poured into molds and allowed to set, or cooled on metal surfaces in a thin layer, or (and this is most advantageous for obtaining a very finely divided sulfur, particularly with a higher proportion than 4 molecules of sulfur to 1 molecule of naphthalene) it may be treated with agitating mechanism in cold water. The sulfur may also be converted into a fine powder by grinding and sifting.

The formation of the naphthalene sulfur may be also used for extracting sulfur from materials containing sulfur, for example from spent gas purifying masses. One brings fused naphthalene at or above the melting point of sulfur together with the mass to be extracted and separates then the obtained naphthalene-sulfur compound from the undissolved material for instance by decantating the fluid compound, whereupon one may separate the naphthalene or use the formed compound as above indicated.

What I claim as my invention, and desire to secure by Letters Patent, is—

1. In the process of preparing finely divided sulfur, the step which consists in fusing sulfur and naphthalene together and allowing the fused mass to become solid.

2. The process for preparing finely divided sulfur which consists in fusing sulfur and naphthalene together, allowing the fused mass to become solid and separating the naphthalene.

3. In the process of preparing finely divided sulfur, the step which consists in bringing fused naphthalene together with sulfur containing materials, and separating the formed naphthalene sulfur compound from the undissolved material.

In witness whereof I have hereunto signed my name this 3rd day of May 1907, in the presence of two subscribing witnesses.

HIPPOLYT KÖHLER.

Witnesses:
  WOLDEMAR HAUPT,
  HENRY HASPER.